UNITED STATES PATENT OFFICE 2,493,153

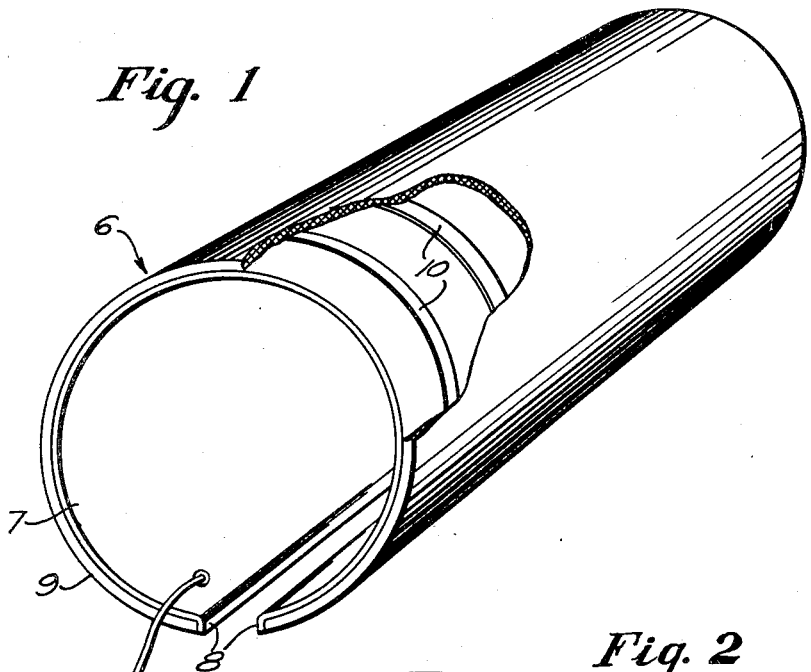
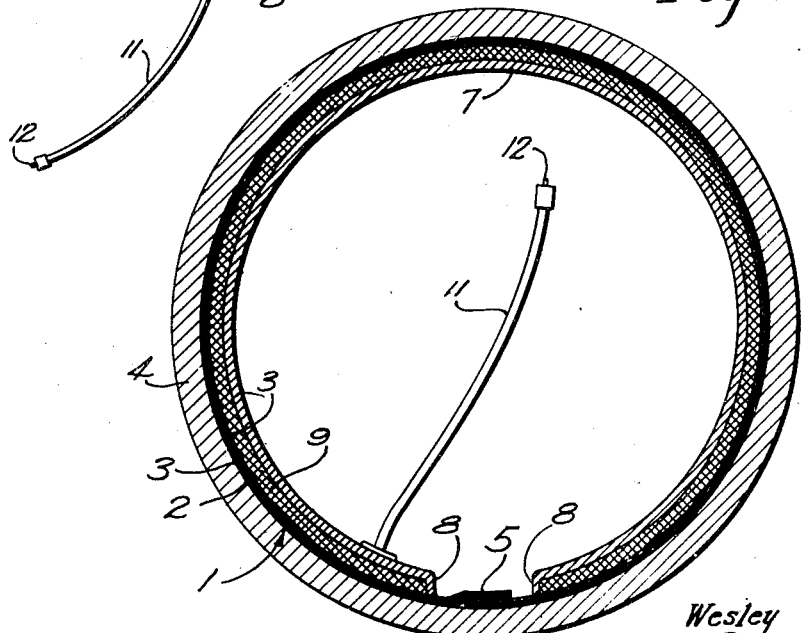

METHOD AND APPARATUS FOR APPLYING SHEET LININGS TO CYLINDERS

Wesley G. Martin, Milwaukee, Wis., assignor to A. O. Smith Corporation, Milwaukee, Wis., a corporation of New York Application March 1, 1945, Serial No. 580,424

2 Claims. (Cl. 154—41)

This invention relates to a method and apparatus for applying sheet linings to cylinders and has been employed in the application of ceramic enamel sheeting, such as that described and claimed by the present inventor in a copending application entitled "Ceramic enamel sheeting," filed January 20, 1945, Serial No. 573,762.

One object of the present invention is to provide a quick and inexpensive method of lining a cylindrical member or the like with thin sheet linings.

Another object of the invention is to provide a method of lining a cylindrical member with ceramic enamel sheeting that provides a glove-like fit there-between and prevents undesirable stressing of the sheeting in service.

Another object is to provide a method of applying ceramic enamel sheeting that enables ready access to the longitudinal seam thereof.

A further object is to provide light weight and readily maneuverable apparatus for applying linings within cylinders and the like.

Other objects of the invention will appear hereinafter in connection with the following description and accompanying drawing illustrating an embodiment of the invention and in which:

Figure 1 is a perspective view of the fixture employed to hold the sheeting against the cylindrical wall, with a portion of the bag removed; and Fig. 2 is a cross-sectional view showing the fixture holding the ceramic enamel sheeting against the wall of a cylinder preparatory to removal of the fixture after the longitudinal seam of the lining has been completed.

The ceramic enamel sheeting 1 with which the invention is employed comprises a thin, metal body portion 2 of less than .010 of an inch in thickness coated preferably on both sides with the ceramic enamel coating 3, as described and claimed in the application above referred to.

In the drawing the sheeting 1 and cylinder wall 4 are shown of exaggerated thickness for illustrative purposes, it being understood that the thin sheeting and shell will actually be of considerably less thickness as compared to the size of the cylinder.

The sheeting 1 has a flexibility that enables application thereof within a cylindrical member such as the shell 4, shown in the drawings, to serve as a lining therefor. The sheeting 1 is secured within the shell 4 by joining the longitudinal edge portions of the sheeting together under any suitable joint construction to provide the longitudinal seam 5 therein. The drawings illustrate the seam 5 as being formed by overlapping the edge portions throughout their longitudinal extent and employing a suitable adhesive material to secure them together.

The invention is particularly directed to the method of holding the sheeting 1 tightly and uniformly against the inner surface of the wall of shell 4 while the longitudinal seam 5 is being made.

The fixture 6 employed to accomplish the holding of the sheeting 1 in tight, uniform relation with shell 4 during the seam forming operation, comprises a trough or generally cylindrical channel-shaped piece 7 of sheet metal having a pair of depending side edges 8 extending radially outward and spaced apart a substantial distance circumferentially of the fixture. A flexible bag covering or member 9 encloses the back of the piece 7.

The piece 7 may be of different dimensions depending upon the size of the cylindrical member with which the fixture 6 is employed. The piece 7 is strengthened by a plurality of transverse ribs 10 extending circumferentially preferably on the outside of the same.

The covering 9 encloses the entire outer surface of the piece 7 and may be suitably sealed to the longitudinal edges 8 and peripheral end edges of the piece 7 to provide the same as one side of the bag formed by joining the covering 9 and piece together, or it may constitute a separate bag laid over the outer surface of piece 7. A closed space is thus formed either between covering 9 and the back of piece 7 or within the bag provided by cover 9 and into which air or the like is forced through end connection 11 to inflate the bag 9. Covering 9 is of a canvas or rubber fabric material capable of holding air or the like and has dimensions that enable substantial radial expansion thereof when inflated. Valve 12 in end connection 11 may be depressed to deflate the covering 9.

In applying sheeting 1 within shell 4, the sheeting 1 is first formed to suitable dimensions to fit within shell 4. The sheeting 1 is then assembled within shell 4 with one longitudinal edge portion of the sheeting loosely overlapping the other longitudinal edge portion of the sheeting preparatory to forming the longitudinal seam 5 in the sheeting.

The fixture 6 is next assembled within the sheeting 1 with piece 7 disposed to straddle the overlapped longitudinal joint area of the sheeting and thereby locate the edges 8 of piece 7 on each side of longitudinal seam 5 at a line substantially removed therefrom. This enables the workman to have free access to the seam within shell 4 while joining the edge portions of sheeting 1 together at the longitudinal seam 5.

The covering or bag 9 is next inflated by admitting fluid under pressure thereto through end connection 11. The inflation of bag 9 forces sheeting 1 outwardly tightly against the cylindrical wall of shell 4. The fixture 6 extends throughout the length of the shell so that sheeting 1 is forced into uniform contact therewith throughout.

While sheeting 1 is held against shell 4 in the manner described, the longitudinal edge portions of the sheeting 1 are secured together by adhesive or the like to form the longitudinal seam 5. After the adhesive has been applied and is set bag 9 of the fixture 6 is deflated by depressing valve 12 of end connection 11. The fixture 6 is then removed and sheeting 1 remains in tight uniform contact with the inside surface of shell 4.

The pressure employed in bag 9 will vary depending upon the use to which shell 4 will be put. Ordinarily a low pressure sufficient to place the sheeting 1 in tight contact with shell 4 will be sufficient.

However, where the shell 4 and sheeting 1 will be subjected to substantial stress in service, the bag 9 may be inflated under a pressure similar to that to which the shell will be subjected in service so that the sheeting or lining 1 will not be under undue stress in service. Where the pressure employed in bag 9 is unusually great the circumferential ribs 10 which resist the tendency of piece 7 of fixture 6 to collapse may be provided on the inside of piece 7 and extend across the space between the edges 8 of piece 7 in the form of struts to more adequately brace the structure.

The method of the invention provides an efficient way of applying flexible ceramic enamel sheeting within cylindrical shells.

The apparatus employed provides access to the longitudinal edges of the sheeting whereby the workman can readily work therein to join the edges together in a longitudinal seam.

Both the method and apparatus enable a tight fit to be obtained between the shell and the ceramic enamel lining.

Various embodiments of the invention may be employed within the scope of the accompanying claims.

I claim:

1. The method of applying flexible ceramic enamel sheeting to the inside of a cylindrical member, comprising positioning the sheeting within the member with the longitudinal edge portions of the sheeting overlapping, applying a separate flexible member in contact with said sheeting throughout the inner surface thereof with the exception of the region of said overlapping longitudinal edges, then applying through said last named member a substantially uniform pressure per unit of area to said sheeting to force the same outwardly into full contact with said cylindrical member, then applying localized sealing means to the overlapped longitudinal edge portions of the ceramic enamel sheeting whereby bonding of the sheeting is obtained only at the overlapped portions thereof, and finally releasing said pressure and removing said flexible member.

2. Apparatus for applying sheet lining to a cylindrical blank, comprising a generally cylindrical rigid backing of substantially less diameter than said blank and having a slot extending along one side to provide access to a longitudinal seam in the sheeting, a flexible member covering the outer surface of said first named member and secured at its edges thereto to provide an expansible bag-like member substantially coextensive in area to the internal area of said blank to be covered by the sheeting, and fittings secured to said backing for admitting pressure fluid between the same and said flexible covering.

WESLEY G. MARTIN.

REFERENCES CITED

The following references are of record in the file of this patent:

UNITED STATES PATENTS

| Number | Name | Date |
| --- | --- | --- |
| 642,539 | Thoma | Jan. 30, 1900 |
| 1,850,999 | Baynard | Mar. 29, 1932 |
| 1,871,982 | Geyer | Aug. 16, 1932 |
| 1,983,705 | Pilblad et al. | Dec. 11, 1934 |
| 2,265,398 | Ryan | Dec. 9, 1941 |
| 2,312,993 | Stephens | Mar. 2, 1943 |
| 2,343,225 | Pray et al. | Feb. 29, 1944 |
| 2,363,933 | Bendix | Nov. 28, 1944 |